March 25, 1930. G. W. STULTZ 1,751,769
AIR AND VAPOR SUPPLY DEVICE FOR INTAKE MANIFOLDS
Filed Nov. 17, 1927
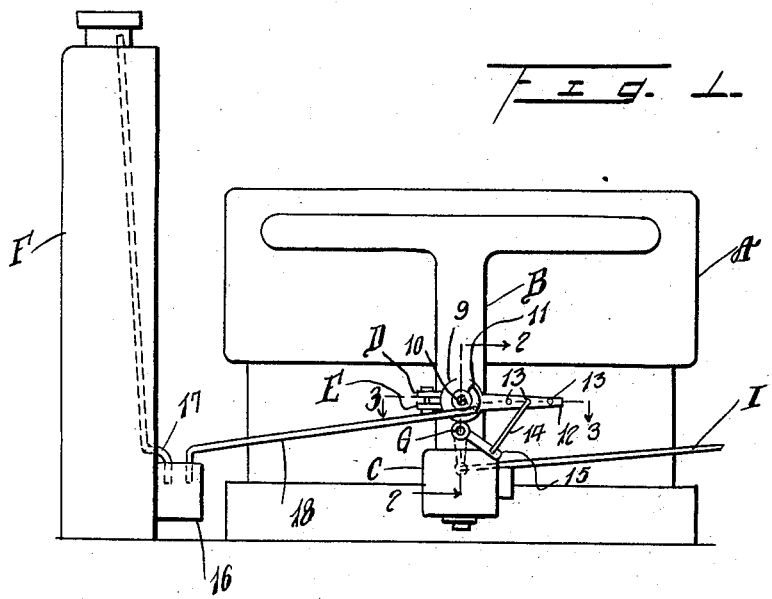
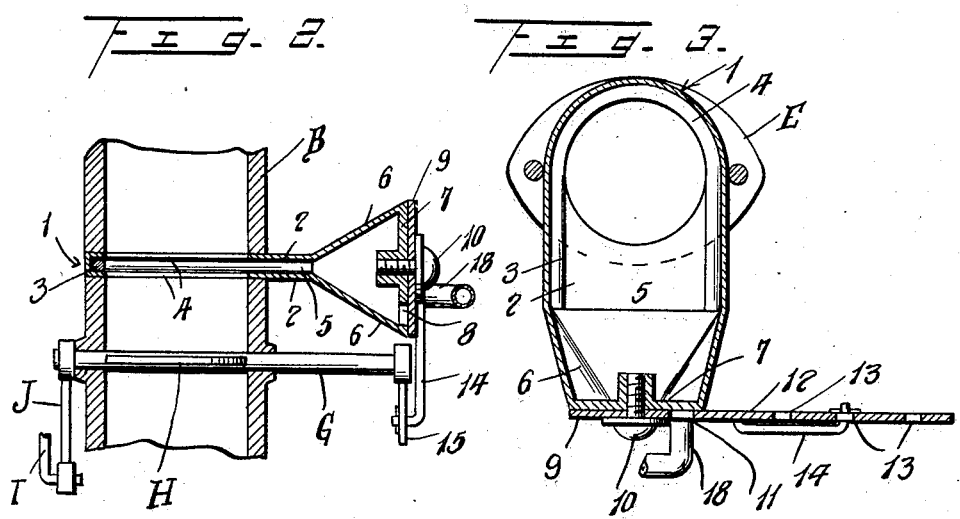
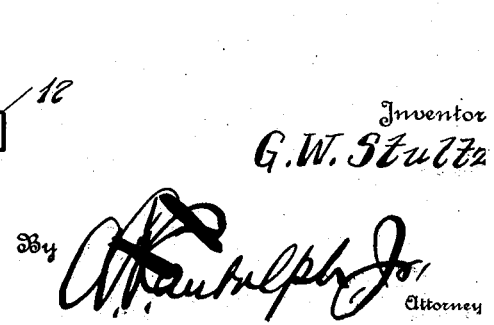
Inventor
G. W. Stultz Patented Mar. 25, 1930

1,751,769

UNITED STATES PATENT OFFICE

GEORGE W. STULTZ, OF HUNTINGTON, WEST VIRGINIA

AIR AND VAPOR SUPPLY DEVICE FOR INTAKE MANIFOLDS

Application filed November 17, 1927. Serial No. 233,883.

The invention relates to an accessory for internal combustion engines such as is used in motor vehicles, and has for its object the provision of an accessory comprising a gasket adapted to be mounted between the connection of the intake manifold to the carburetor, one side of said gasket being presented outwardly of the connection and having ports therein controlled by a valve that is operatively connected with the shaft of the throttle valve and so arranged that as the speed of the engine increases the air ports will be opened to admit air to the intake manifold, the valve closing when the speed is reduced. A chamber is also mounted adjacent to the top of the radiator and connected by suitable conduits with the upper part of the radiator to permit vapor therein to enter the chamber and from thence is conveyed by another conduit connected with the gasket to supply water vapor to the intake manifold to be mixed with the fuel for the engine.

The invention furthermore has for its object the provision of a gasket made of sheet material, such as metal having spaced walls with a U-shaped reinforcement separating said walls and closing the space around the outer edges thereof, said gasket being adapted to be mounted in the connection between the intake manifold and the carburetor, and the walls thereof provided with alined openings to aline with the openings in the intake manifold, the walls of the gasket being extended outside of the intake manifold and forming with the ends of the U-shaped member an air chamber, said walls being also outwardly flared and having a wall closing the outer portion of the outwardly flared walls and provided with air ports controllable by a rotary valve mounted on the last mentioned wall.

The invention will be described in detail hereinafter and will be found illustrated in the accompanying drawings in which Figure 1 is a side view of a conventional automobile engine and radiator showing the air and vapor supply accessory in connection therewith, Figure 2 is a sectional detail on the plane indicated by the line 2—2 of Figure 1, Figure 3 is another sectional detail on a plane indicated by the line 3—3 of Figure 1, and Figure 4 is a view of the end of the gasket and valve on a larger scale.

In the drawings similar reference characters are used to designate corresponding parts throughout the several views.

In Figure 1 is shown a conventional automobile engine A having an intake manifold B and a carburetor C, the intake manifold B and carburetor C having oppositely disposed flanges D and E respectively through which they are secured together. F suggests the radiator for the engine A.

The invention comprises a gasket 1 formed of sheet metal with spaced walls 2, 3 designating a U-shaped member secured between the outer edges of the walls 2 to space said walls from one another. The gasket 1 is to be mounted between the flanges D and E, and the walls 2 are provided with alined openings 4 that aline with the interior of the intake manifold B. The ends of the U-shaped member 3 extend outside of the edges of the flanges D and E and together with the walls 2 form an air chamber 5, and the walls 2 are outwardly flared as shown at 6 and closed by a wall 7 provided with a plurality of ports 8. 9 indicates a valve rotatably mounted on a pin or bolt 10 and provided with an arcuate slot 11 that is adapted to be alined with the air ports 8. The valve 9 has an extended arm 12 that is provided with a series of openings 13 to receive one end of a link 14 that has its other end secured to an arm 15 mounted to rotate with the throttle valve shaft G and so arranged that as the throttle valve H is actuated to increase the speed of the engine the arcuate slot 11 uncovers more or less of the openings 8 to admit an added supply of air to the intake manifold. The throttle valve shaft is actuated in the usual manner by means of throttle control rod 9 engaging arm J secured to the end of shaft G as clearly shown in Figure 2.

The invention also contemplates supplying the intake manifold and the engine cylinders with water vapor and to that end a trap 16 is secured to the radiator F and communicates with the upper portion of the interior of the radiator by means of an overflow pipe or other conduit 17, 18 being another pipe or conduit leading from the trap 16 and connected in one of the openings 8 forming the air port.

In operation it will be understood that while the motor or engine A is in operation, moisture laden air will be drawn from the upper portion of the radiator F through the conduit 17, trap 16, and conduit 18 into the air chamber 5 and from thence will enter the intake manifold B and be mixed with the fuel, the presence of this moisture serving to increase the efficiency of the engine and also to soften carbon that might form on the walls of the cylinder and the head of the piston in the cylinder. As the speed of the engine increases by opening the throttle valve H by rotation of the shaft G, the arm 15 will be actuated by said rotation of the shaft G and through the link 14 that is connected with the arm 12 will actuate the valve 9 to open one or more air ports 8 more or less, and the air entering through the ports 8 mixed with the fuel and the vapor in the intake manifold will provide a better fuel mixture for the high speed of the engine.

What is claimed is:—

An air and vapor supply device for intake manifolds, comprising a hollow gasket adapted for insertion in an intake manifold and having openings to aline with the interior of the manifold, a chamber communicating with the hollow gasket and having a wall provided with a plurality of openings communicating with the chamber, a tubular member secured in one of said openings and adapted to convey vapor to said chamber and gasket, and a valve member pivotally mounted on said wall and including a plate having a slotted opening receiving said tubular member and adapted to aline with the other openings in the plate in certain positions thereof.

In testimony whereof I affix my signature.

GEORGE W. STULTZ.